(12) United States Patent
Hegewald et al.

(10) Patent No.: US 10,611,289 B2
(45) Date of Patent: Apr. 7, 2020

(54) TRANSPORT VEHICLE FOR CONTAINERS (71) Applicant: Konecranes Global Corporation, Hyvinkää (FI)

(72) Inventors: Mike Hegewald, Düsseldorf (DE); Jannis Moutsokapas, Monheim (DE)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 16/062,317

(22) PCT Filed: Dec. 14, 2016

(86) PCT No.: PCT/EP2016/081035
§ 371 (c)(1),
(2) Date: Jun. 14, 2018

(87) PCT Pub. No.: WO2017/102862
PCT Pub. Date: Jun. 22, 2017

(65) Prior Publication Data
US 2018/0370411 A1 Dec. 27, 2018

(30) Foreign Application Priority Data
Dec. 15, 2015 (DE) .......... 10 2015 121 804

(51) Int. Cl.
*B60P 1/64* (2006.01)
*B60P 1/02* (2006.01)
*B60P 7/13* (2006.01)

(52) U.S. Cl.
CPC ............... *B60P 1/6481* (2013.01); *B60P 1/02* (2013.01); *B60P 1/6445* (2013.01); *B60P 7/13* (2013.01)

(58) Field of Classification Search
CPC ........... B60P 1/6445; B60P 7/13; B60P 1/649; B60P 1/027; B60P 1/6418; B60P 3/40; B60P 1/14; B60P 1/16
(Continued)

(56) References Cited

U.S. PATENT DOCUMENTS

| 4,867,622 A | 9/1989 | Brown |
| 5,017,066 A | 5/1991 | Tylisz |

(Continued)

FOREIGN PATENT DOCUMENTS

| AU | 2007312441 A1 | 4/2008 |
| CA | 2757417 A1 | 12/2010 |

(Continued)

OTHER PUBLICATIONS

Preliminary Report on Patentability of the International Searching Authority in English from corresponding Patent Cooperation Treaty (PCT) Application No. PCT/EP2016/081035, completed Jun. 19, 2018.

(Continued)

*Primary Examiner* — D Glenn Dayoan
*Assistant Examiner* — Sunsurraye Westbrook
(74) *Attorney, Agent, or Firm* — Gardner, Linn, Burkhart & Ondersma LLP (57) ABSTRACT

A transport vehicle for containers, with a first set-down surface on which a container can be set down, and with two opposite guide surfaces which run directed towards each other in the direction of the first set-down surface in order to guide a container in the direction of the first set-down surface when setting the container down on the transport vehicle (1) with the first set-down surface arranged between the guide surfaces. An adapter is provided which is movable between a standby position and an operating position in such a manner that a container, when being set down on the (Continued)

transport vehicle, is guided onto the first set-down surface when the adapter is in the standby position, and is guided onto a second set-down surface formed by the adapter and arranged between the guide surfaces when the adapter is placed onto the transport vehicle in the operating position.

19 Claims, 3 Drawing Sheets (58) Field of Classification Search
USPC ........ 410/69, 121, 94, 70, 84; 414/460, 800, 414/342, 392, 561, 809; 424/125, 409, 424/93.1, 93.4, 93.7, 184.1
See application file for complete search history.

(56) References Cited

U.S. PATENT DOCUMENTS

| | | | |
|---|---|---|---|
| 5,525,884 A * | 6/1996 | Sugiura | G05D 1/0261 180/168 |
| 6,206,127 B1 | 3/2001 | Zakula et al. | |
| 6,557,658 B1 | 5/2003 | Enmeiji et al. | |
| 7,350,840 B2 | 4/2008 | Franzen et al. | |
| 8,108,090 B2 * | 1/2012 | Bauer | B60L 15/38 701/23 |
| 8,128,064 B2 * | 3/2012 | Franzen | B60P 1/6445 254/2 C |
| 8,157,492 B2 * | 4/2012 | Franzen | B60P 7/13 410/69 |
| 8,651,793 B2 | 2/2014 | Franzen et al. | |
| 8,789,635 B2 | 7/2014 | Franzen et al. | |
| 9,522,623 B2 | 12/2016 | Franzen et al. | |
| 9,701,518 B2 | 7/2017 | Rosenstrom et al. | |
| 2001/0038777 A1 | 11/2001 | Cassell | |
| 2010/0213430 A1 * | 8/2010 | Franzen | B60P 1/6445 254/9 C |
| 2014/0017045 A1 | 1/2014 | Wieschemann et al. | |
| 2014/0017046 A1 | 1/2014 | Wieschemann et al. | |
| 2016/0362033 A1 | 12/2016 | Hegewald et al. | |
| 2017/0182923 A1 | 6/2017 | Hegewald | |

FOREIGN PATENT DOCUMENTS

| | | |
|---|---|---|
| CN | 2784352 Y | 5/2006 |
| CN | 201325577 Y | 10/2009 |
| CN | 201367098 Y | 12/2009 |
| CN | 101746486 A | 6/2010 |
| CN | 101945801 A | 1/2011 |
| DE | 102007039778 A1 | 2/2009 |
| DE | 102009025051 A1 | 12/2010 |
| DE | 102013114841 A1 | 6/2015 |
| GB | 1464383 A | 2/1977 |

OTHER PUBLICATIONS

Commonly assigned co-pending U.S. Appl. No. 15/755,727, filed Feb. 27, 2018, entitled Heavy-Duty Lift Truck.
Commonly assigned co-pending U.S. Appl. No. 15/773,116, filed May 2, 2018, entitled Transport Vehicle for Containers, Comprising a Battery Module for Supplying the Drive Unit.
Commonly assigned co-pending U.S. Appl. No. 16/062,341, filed Jun. 14, 2018, entitled Transport Vehicle for Containers.
International Search Report of the International Searching Authority from corresponding Patent Cooperation Treaty (PCT) Application No. PCT/EP2016/081035, indicated completed on Feb. 16, 2017.
Written Opinion of the International Searching Authority from corresponding Patent Cooperation Treaty (PCT) Application No. PCT/EP2016/081035, indicated completed on Feb. 16, 2017.

* cited by examiner

Fig. 1 ic # TRANSPORT VEHICLE FOR CONTAINERS

CROSS REFERENCE TO RELATED APPLICATIONS

The present application claims the priority benefits of International Patent Application No. PCT/EP2016/081035, filed Dec. 14, 2016, and claims benefit of German patent application DE 10 2015 121 804.6, filed Dec. 15, 2016.

BACKGROUND OF THE INVENTION

The invention relates to a transport vehicle for containers, having a first set-down surface on which a container can be set down, and having two mutually opposing guide surfaces which extend towards one another in the direction of the first set-down surface in order to guide a container during set-down on the transport vehicle in the direction of the first set-down surface, wherein the first set-down surface is disposed between the guide surfaces.

Typical areas of application of such transport vehicles are loading and unloading plants for containers and in this connection in particular the transport of containers within container terminals in sea ports or inland ports and in container terminals for combined traffic between road and rail.

In this context, containers are understood to be ISO containers in the sense of large-capacity or sea freight containers with standardised pick-up points or corner fittings for load picking-up means which are used in the international transportation of goods. The most widely used are ISO containers with a standard width of 8 feet or 2438 mm and a length of 20, 40 or 45 feet.

Furthermore, containers also designated as pallet-wide or wide-body containers should also be included, having a width of more than 2438 mm, in particular of about 2500 to 2550 mm but otherwise having the stated lengths and standardised corner fittings of ISO containers.

A corresponding transport vehicle is arranged for a payload of at least 20 t and is accordingly designed as a heavy-duty transport vehicle. Said containers can weigh up to 45 t in the loaded condition. A transport vehicle which travels empty or transports an empty container should also be understood in this way provided that this vehicle can transport a payload of at least 20 t.

Such transport vehicles usually comprise wheels with tires, e.g. air-filled rubber tires, and are also floor-bound but not rail-bound and can therefore travel freely. Accordingly, the transport vehicles in the present case are to be distinguished from rail vehicles and in particular railway wagons. Furthermore, the transport vehicles can be operated manually via an accompanying driver in the driver's cabin, in a semi-automated manner or—in the case of so-called automated guided vehicles (AGVs) which do not have to have a driver's cabin—in a fully automated manner and therefore in a driverless manner. These transport vehicles are conventionally driven by diesel-electric, diesel-hydraulic or fully electric means, in particular by battery.

Transport vehicles which correspond to one of the above-described types are known e.g. from the German laid-open documents DE 10 2007 039 778 A1 and DE 10 2009 025 051 A1.

In the known transport vehicles, in particular the guide surfaces formed by so-called position-adapters are arranged for the transportation of ISO-containers of standard width. In this connection, the guide surfaces comprise a minimum and, in particular, unchangeable distance from each other, which is somewhat greater than the standard width of 2438 mm but less than the width of a wide-body container. Thus in particular wide-body containers cannot be set down in a stable manner on a set-down surface disposed in the region of the minimum distance between the guide surfaces. However, this would be required for secure transportation since the containers are not generally locked in their corner regions by means of twist locks in the case of such transport vehicles. Secure and stable set-down on the regions of the guide surfaces which are spaced widely enough apart and usually extend in an inclined manner is not possible since in this case there is a risk of slipping down on the inclined guide surfaces and of the container being in an unstable inclined position. Thus, corresponding wide-body containers have previously not been transported with the above-mentioned transport vehicles and in particular not loaded in an automated manner on corresponding transport vehicles but have been handled and transported using manually operated transport vehicles such as e.g. reach stackers.

SUMMARY OF THE INVENTION

The present invention provides an improved transport vehicle for containers which permits particularly easy adaptation for secure and stable transportation of differently designed containers including in automated container terminals.

A transport vehicle for containers, having a first set-down surface on which a container can be set down, and having two mutually opposing guide surfaces which extend towards one another in the direction of the first set-down surface in order to guide a container during set-down on the transport vehicle in the direction of the first set-down surface, wherein the first set-down surface is disposed between the guide surfaces, is improved in that an adapter is provided which can be moved between a standby position and an operating position in such a way that a container is guided onto the first set-down surface during set-down on the transport vehicle when the adapter is in the standby position, and is guided onto a second set-down surface, which is formed by the adapter and disposed between the guide surfaces, when the adapter is placed onto the transport vehicle in the operating position.

In this way, existing transport vehicles can, if necessary, be adapted in a particularly easy and flexible manner by the temporary provision of the adapter and an associated temporary formation of a second set-down surface between the guide surfaces, in order to be able to securely receive and transport a differently designed container without, for this purpose, the arrangement of the guide surfaces having to be changed or the width of the first guide surface having to be increased. By placement of the adapter in its operating position, the second set-down surface thereby provided is—as seen in a lowering direction of a container to be set down—operationally upstream of the first set-down surface in such a way that the first set-down surface is deactivated or is inoperative and can no longer be reached from the lower side, in particular the lower corner fittings, of the container to be set down, in order to be set down on the first set-down surface. Therefore, during lowering, a container is inevitably set down on the second set-down surface instead of the first set-down surface and in this connection is possibly correspondingly guided and orientated by at least one of the two guide surfaces. In contrast, when the adapter is in the standby position, the first set-down surface is activated and operative so that, during lowering, a container is inevitably set down on the first set-down surface and in this connection is possibly correspondingly guided and orientated by at least one of the two guide surfaces. The second set-down surface is correspondingly deactivated and inoperative in the standby position. A transport vehicle designed in this way permits secure and stable transport of differently designed containers, in particular even when the transport vehicle is guided in a fully automated manner and is accordingly designed and operated as a driverless transport vehicle in the sense of an AGV. In this connection, the adapter can thus be moved manually between the standby position and the operating position. In this case, no permanent connection or guidance of the adapter on the transport vehicle is required.

In an advantageous manner provision is made that the adapter is displaceably mounted on the transport vehicle between the standby position and the operating position. In this case, the adapter is thus connected to the transport vehicle via a suitable bearing. In this way, the adapter can easily be moved and thus guided e.g. by displacing and/or pivoting in such a way that the second set-down surface is activated and the first set-down surface is deactivated and vice versa.

In an advantageous manner provision is made that the adapter has a planar upper side which extends in a horizontal plane when the adapter is in the operating position, in order to form the second set-down surface. For this purpose, the adapter is designed in a constructionally simple manner, preferably in a plate-like or frame-like manner and is produced from steel material.

In an advantageous manner provision is made that the first set-down surface and the second set-down surface are disposed with respect to one another such that a container set down on the first set-down surface is positioned with its lower side, in particular with its lower corner fittings, between the guide surfaces in a preferably horizontal first plane and a container set down on the second set-down surface is positioned with its lower side, in particular with its lower corner fittings, between the guide surfaces in a preferably horizontal second plane, the second plane is disposed above the first plane, and, in the second plane, the guide surfaces are spaced apart at a greater distance from each other than in the first plane. In this way, containers of different widths, in particular wide-body containers, which cannot be set down in a stable manner on the first set-down surface with a horizontally orientated lower side between the guide surfaces, can be set down in a stable and therefore secure manner on the second set-down surface in a horizontal orientation between the guide surfaces on the temporarily provided second set-down surface. If then a container of standard width is to be transported, the adapter can easily be moved into the standby position.

In this way, the second set-down surface is moved away or deactivated and the first set-down surface is activated and operative. This is advantageous since, for containers of standard width which is narrower than wide-body containers, improved orientation and positioning is effected by reason of the smaller minimum distance between the guide surfaces in the region of the lower first plane.

In a constructionally simple manner provision is made that the adapter is placed, in the operating position, on a support surface of the transport vehicle which is cleared in the standby position. As a result, the adapter can be designed as a simple, passive and, in particular, self-supporting element which, in its vertical position between the guide surfaces, is held solely by its lower side of the preferably stationary support surface, which is fixed in relation to the guide surfaces, being set down or placed with surface contact without an active holding drive being required for holding in the vertical position. The adapter merely has to comprise, in itself, suitable dimensions and bearing capacity in order to keep the second set-down surface dimensionally stable even under the effect of a container.

In a constructionally simple manner provision is made that the support surface is formed on the first set-down surface. Therefore, in the operating position the adapter is set down on the first set-down surface and, in its standby position, clears said set-down surface. In this way the second set-down surface can be activated in a particularly simple manner and the first set-down surface can be upstream of the first set-down surface in order to deactivate the first set-down surface.

In an alternative embodiment provision can be made that the support surface is formed outside, in particular next to and/or below, the first set-down surface. This can be advantageous if the adapter in its standby position is disposed in such a way that, starting from that point, it cannot be placed on the first set-down surface in its operating position. In addition, the first set-down surface is not loaded and impaired by the lowered adapter.

In a constructionally simple manner provision is also made that the adapter can be moved by means of a positioning device with a positioning drive between the standby position and the operating position, wherein the positioning drive is preferably designed as a linear drive and in particular includes a lifting cylinder, preferably an electric cylinder or hydraulic cylinder, or a belt drive, chain drive or rack-and-pinion drive.

In a constructionally simple manner provision is also made that the adapter is disposed on a positioning arm of the positioning device and the positioning arm is mounted on the transport vehicle in a movable, in particular pivotable, manner and is drivingly connected to the positioning drive in order to move the adapter between the standby position and the operating position.

A particularly advantageous use of a transport vehicle designed as described above is produced in relation to the picking up and transportation of a container designed as a wide-body container.

An exemplified embodiment of the invention is explained in greater detail with reference to the following description.

DESCRIPTION OF THE PREFERRED EMBODIMENTS

Figure 1:
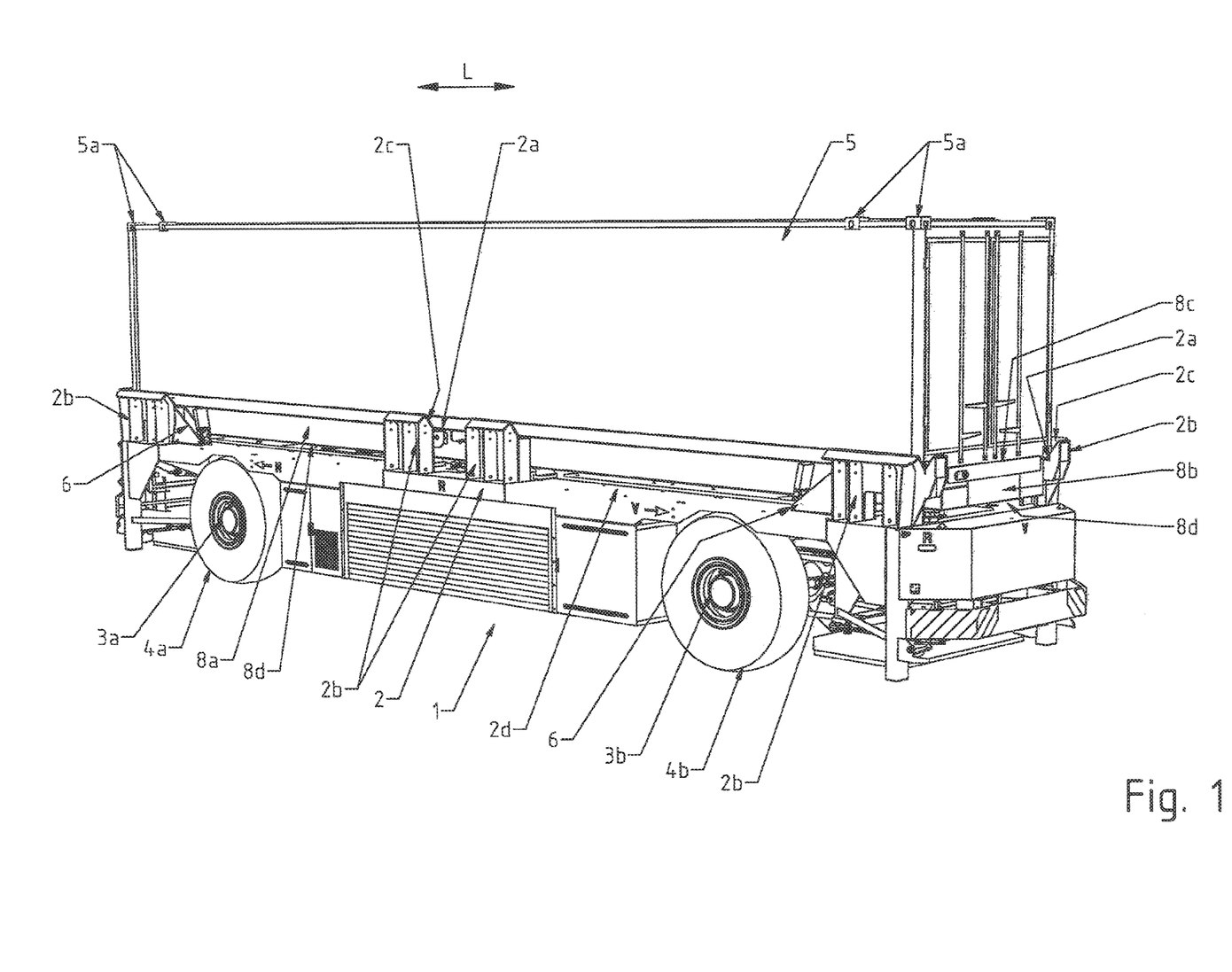
FIG. 1 is a perspective view of a transport vehicle designed as a lifting AGV.

FIG. 1 shows a perspective view of a floor-bound transport vehicle 1 for containers 5, in particular ISO-containers and wide-body containers, which is designed in the manner of an AGV, able to be operated in a fully automated driverless manner, and in particular having no driver's cabin. However, the transport vehicle 1 can also be operated manually or in a semi-automated manner and for this purpose can have a driver's cabin. The transport vehicle 1 designed as a four-wheeled vehicle, comprises a vehicle frame 2 on which, on a common front axle 3a, two front wheels 4a and, on a common rear axle 3b, two rear wheels 4b are mounted. The four wheels 4a, 4b are provided with a tire arrangement which is preferably an air-filled rubber tire arrangement in the sense of tires. By means of the wheels 4a the floor-bound transport vehicle 1 can travel freely and therefore in a non-rail-bound manner.

Furthermore, the transport vehicle 1 comprises a drive unit which substantially consists of a front electric motor, a front power take-off gear, a rear electric motor and a rear power take-off gear. As seen in the longitudinal direction L of the transport vehicle 1, the front electric motor is attached below the vehicle frame 2 centrally and in the region of the front axle 3a. As seen in the longitudinal direction L of the transport vehicle 1, the rear electric motor is attached below the vehicle frame 2 centrally and in the region of the rear axle 3b. The front electric motor drives the two front wheels 4a via the front power take-off gear, and the rear electric motor drives the two rear wheels 4b via the rear power take-off gear. Therefore, the transport vehicle 1 has an all-wheel drive. The drive unit can be designed in a diesel-electric or fully electric manner with a battery, in particular a lead battery.

On an upper side 2d of its vehicle frame 2, the transport vehicle 1 comprises a first set-down surface 2a, extending in a horizontal plane, on which a 45 foot long container 5, designed as an ISO container, is set down. In the case of containers of this length, in each case at the ends opposite each other in the longitudinal direction L, corner fittings 5a are provided offset at a 45 foot position and additionally, also starting from each end, offset by 2.5 feet with respect to the middle of the container at a 40 foot position. Consequently, the first set-down surface 2a extends in the longitudinal direction L between the two 45 foot positions. In this way, a 40 foot long container 5 or two 20 foot long containers 5 one behind the other as seen in the longitudinal direction L and designed as (an) ISO container(s), can be set down on the first set-down surface 2a, in particular via its (their) lower corner fittings 5a. The corner fittings 5a of a 40 foot long container 5 set down centrally in the longitudinal direction L are disposed at the 40 foot position. 20 foot long containers 5 are disposed with their corner fittings 5a at the 45 foot position, which corner fittings face the ends of the transport vehicle 1 opposite each other in the longitudinal direction L. The corner fittings 5a which face the centre of the vehicle as seen in the longitudinal direction L are correspondingly disposed at a 20 foot position of the first set-down surface 2a.

Furthermore, two mutually opposing guide surfaces 2c are provided on the vehicle frame 2 of the transport vehicle 1, the first set-down surface 2a being disposed between said guide surfaces. In this connection, the first set-down surface 2a is disposed fixed with respect to the guide surfaces 2c. The preferably planar guide surfaces 2c extend in each case in the longitudinal direction L between the two outer 45 foot positions. The guide surfaces 2c also extend in the direction of the first set-down surface 2a in a funnel-like manner towards each other, but terminate at a minimum distance d1 with respect to each other (see FIG. 2a). In other words, the guide surfaces 2c are spaced apart from each other at their lower end facing the first set-down surface 2a by the minimum distance d1 and, starting from this point, extend upwards away from the first set-down surface 2a and away from each other, by which extension the guide surfaces 2c are increasingly mutually spaced apart in the upwards direction. The minimum distance d1 therefore corresponds to a maximum width of the first set-down surface 2a at a right angle to the longitudinal direction L. By means of this design of the guide surfaces 2c, a container 5 or the lower corner fitting fittings 5a thereof can, during lowering effected for set-down on the transport vehicle 1, be guided by the guide surfaces 2c in the direction of the first set-down surface 2a and can be laterally orientated in a corresponding manner with respect to the first set-down surface 2a. Furthermore, the guide surfaces 2c serve to secure containers 5 set down on the transport vehicle 1 against slipping. This applies for all the container lengths mentioned above.

FIG. 1 shows that the first set-down surface 2a and each guide surface 2c is composed of a plurality of separate mutually spaced partial surfaces which are each formed by a guide element 2b also designated as a position adapter. For this purpose, in the region of the corners of two notional rectangles disposed one behind the other as seen in the longitudinal direction L, in each case one guide element 2b is disposed on the vehicle frame 2. Therefore, at each of the two ends of the transport vehicle 1, which are opposite each other in the longitudinal direction L, two outer guide elements 2b are disposed which cover the 45 foot positions and the 40 foot positions and accordingly extend therebetween with their partial surfaces of the first set-down surface 2a and of the associated guide surface 2c. Between the outer guide elements 2b, in the region of the centre of the vehicle, two further pairs of inner guide elements 2b are disposed which each cover one of the 20 foot positions with their partial surfaces. The inner guide elements 2b respectively allocated to one long side can also be combined to form a single inner guide element 2b, of which the two 20 foot positions are covered.

FIG. 1 also shows that, on the vehicle frame 2, as seen in the longitudinal direction L of the transport vehicle 1, a first lifting platform 8a and a second lifting platform 8b are disposed one behind the other. The transport vehicle 1 is thus designed as a so-called lifting AGV.

Figure 2A:
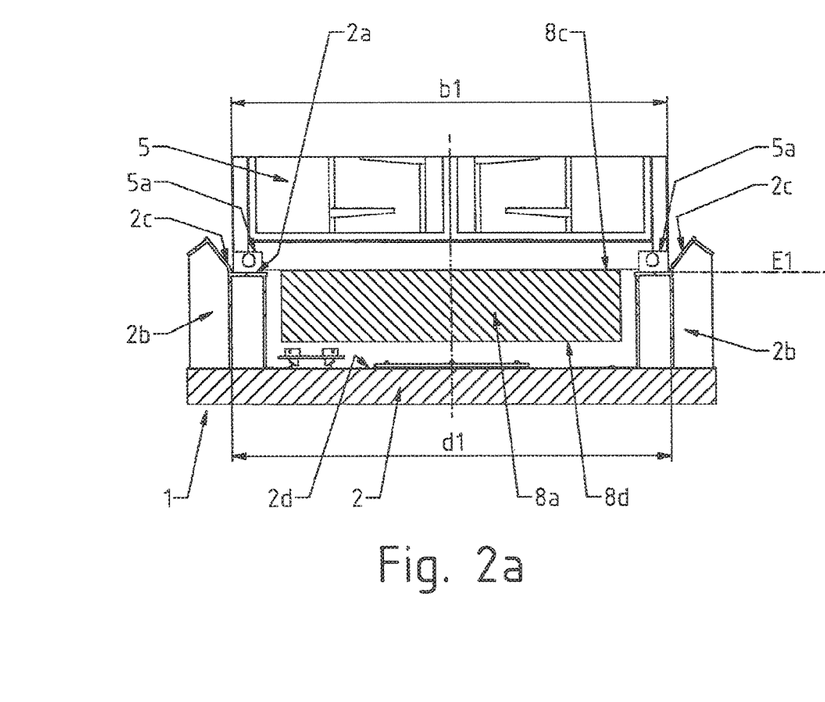
FIG. 2a is a schematic cross-sectional view of a front side of the transport vehicle according to FIG. 1.

The lifting platforms 8a, 8b are disposed in particular between the guide surfaces 2c, wherein a partial surface of the first set-down surface 2a extends between each lifting platform 8a, 8b and each guide surface 2c (see FIG. 2a). Starting from the respective guide surface 2c, each partial surface of the first set-down surface 2a extends preferably approximately far enough in the direction of the lifting platform 8a, 8b that a corner fitting 5a can lie on the partial surface with full surface contact. The lifting platforms 8a, 8b are formed in a cuboidal manner and can be raised and lowered via their respective lifting drive independently of each other or in synchronism relative to the guide surfaces 2c and between these and the partial surfaces of the first set-down surface 2a adjoining same. By means of the lifting platforms 8a, 8b containers 5 can thus be set down on the first set-down surface 2a and be raised starting therefrom.

In this connection, raising and lowering between a raised lifting position, in which a lower side 8d of the lifting platform 8a, 8b is spaced apart from the upper side 2d of the vehicle frame 2, and a transportation position is possible. In the lifting position the lifting platforms 8a, 8b support the containers 5 standing on their upper side 8c. The lifting platforms 8a, 8b are lowered into the transportation position in order for containers 5 to be set down on the first set-down surface 2a. FIG. 1 shows the two lifting platforms 8a and 8b both in the lowered transportation position. In the transportation position, the lower side 8d is in each case lowered on the upper side 2d, whereby the lifting drive disposed between the vehicle frame 2 and the corresponding lifting platform 8a, 8b is in each case bridged in relation of a force flow between the associated lifting platform 8a, 8b and the vehicle frame 2. Alternatively or additionally, for the purpose of set-down on the vehicle frame 2, in the transportation position the upper side 8c of the lifting platform 8a, 8b can additionally be spaced apart from the lower side of the set-down container 5 and therefore not be in contact therewith. In this way it is achieved that the lifting drives and also the lifting platforms 8a, 8b are not loaded by set-down containers 5 since all loads applied by set-down containers 5 and the corresponding force flow via the first set-down surface 2a are dissipated or introduced into the vehicle frame 2. The lifting platforms 8a, 8b are thus located in the transportation position during transportation of containers 5.

Furthermore, the length of each individual lifting platform 8a, 8b is in each case chosen so that on the upper side 8c of the corresponding lifting platform 8a, 8b in each case a 20 foot long container 5, not illustrated, can be picked up. The first lifting platform 8a and the second lifting platform 8b also complement each other for the case where they are raised and lowered in synchronism to form a large lifting platform on which a 40 foot long container 5 or the 45 foot long container 5 illustrated in FIG. 1 can be received. The transport vehicle 1 is thus designed as a heavy-duty transport vehicle in the sense defined in the introduction and is arranged for a corresponding payload.

Figure 2B:
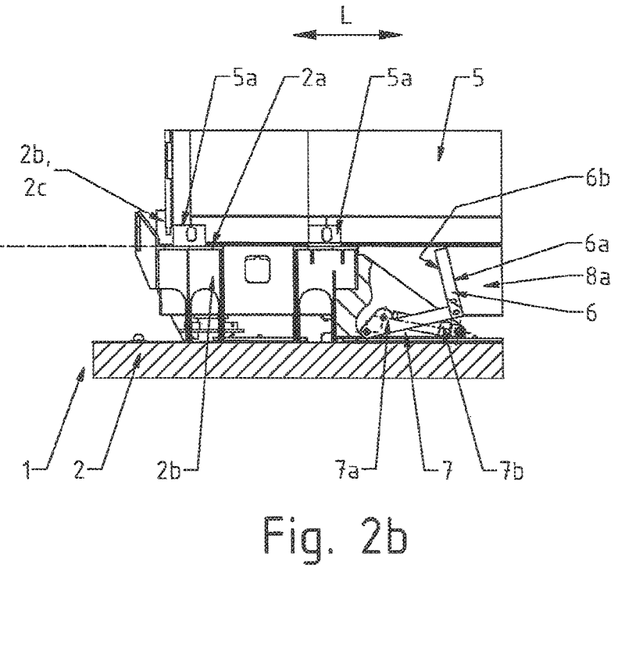
FIG. 2b is a schematic cross-sectional view of a section of a long side of the transport vehicle according to FIG. 1 with an adapter in a standby position.
Figure 3A:
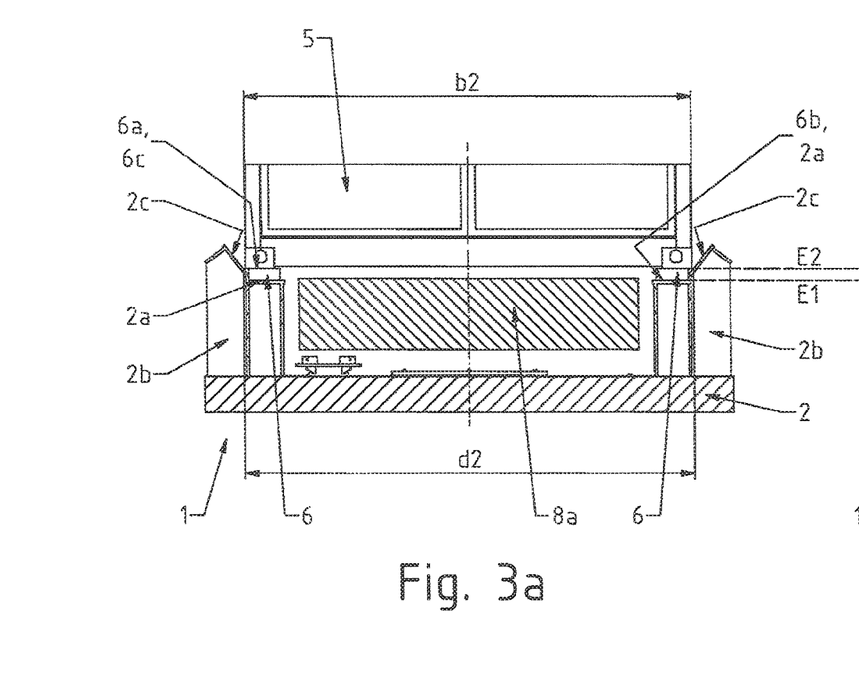
FIG. 3a is the cross-sectional view according to FIG. 2a with two adapters in their operating position.
Figure 3B:
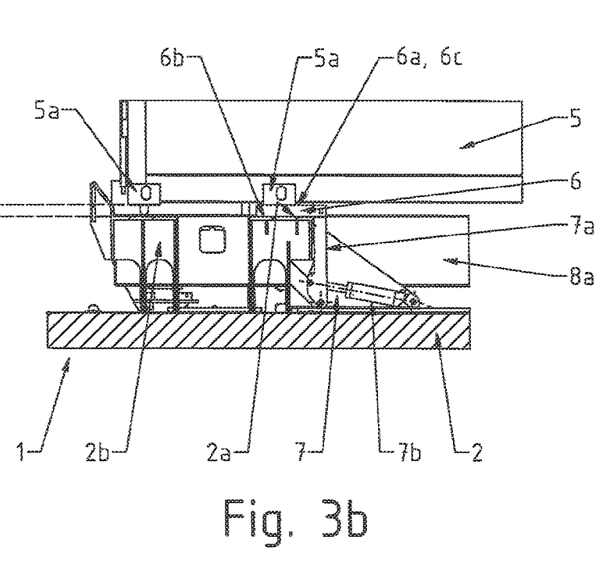
FIG. 3b is the cross-sectional view according to FIG. 2b with one adapter in its operating position.

The transport vehicle 1 has a total of four plate-like adapters 6, of which in each case one adapter 6 is allocated to one of the outer guide elements 2b. FIG. 1 accordingly illustrates two adapters 6 which are disposed on the illustrated long side of the transport vehicle 1. Each adapter 6 is movable in the same way between a standby position and an operating position. For this purpose, the adapters 6 are mounted on the transport vehicle 1 in a correspondingly movable manner, e.g. in each case via a positioning device 7. In particular, the adapters 6 are able to move in synchronism and in an automated manner between the respective standby position and operating position. When the adapters 6 are in the standby position, a container 5 is inevitably guided onto the first set-down surface 2a and set down thereon during set-down on the transport vehicle 1. This situation is illustrated in FIGS. 1 and 2a and 2b described below. When the adapters 6 are in the operating position in which the adapters 6 are set down on the transport vehicle 1, a container 5 is inevitably guided, during set-down on the transport vehicle 1, onto a second set-down surface 6a formed by the adapters 6 and disposed between the guide surfaces 2c and is set down thereon. This situation is illustrated in FIGS. 3a and 3b described below.

FIG. 2a shows a schematic cross-sectional view of a front side of the transport vehicle 1 according to FIG. 1. The first lifting platform 8a facing the front side is illustrated in the transportation position lowered onto the vehicle frame 2. Also shown are the two outer guide elements 2b facing the front side. The two outer guide elements 2b facing the rear side and shown in FIG. 1 are, like the inner guide elements 2b shown in FIG. 1, concealed and therefore not illustrated in FIG. 2a.

The container 5 illustrated in FIG. 2a and set down on the first set-down surface 2a has a width b1 of 2438 mm which corresponds to the standard width of ISO containers and which can be received in the region of the minimum distance d1 between the guide surfaces 2c. The container 5 is in this connection set down with its lower corner fittings 5a on the first set-down surface 2a and in particular on the partial surfaces thereof which are formed by the outer guide elements 2b. The lower corner fittings 5a also designated as corner-castings and disposed on the lower side of the container 5 are in this way positioned in a horizontal plane E1 which extends in parallel with the horizontal first set-down surface 2a and is, in particular, formed thereby. The lower side of the container 5 is also orientated horizontally and in parallel with the first plane E1.

FIG. 2b is a schematic cross-sectional view of a section of a long side, extending in the longitudinal direction L, of the transport vehicle 1 according to FIG. 1 with an adapter 6 in the standby position. The section shows the end, facing the front side of FIG. 2a, of the transport vehicle 1, with one of the two outer guide elements 2b allocated to this end. The opposite long side, not illustrated, is designed in an identical manner. In the same way, two corresponding guide elements 2b and two adapters 6 are also disposed in the standby position at the rear-side end of the transport vehicle 1 which is opposite the front side, said guide elements and adapters are moveable from said position into the operating position via corresponding positioning devices 7. For reasons of symmetry the statements made in relation to the adapters 6 and positioning devices 7 illustrated in FIGS. 1, 2b and 3a and 3b apply for all adapters 6 and positioning devices 7 which are not illustrated.

FIG. 2b also illustrates a positioning device 7 for the adapter 6 with a positioning arm 7a which is designed as a pivoting arm and is rotatably mounted on the long side of the vehicle frame 2. In this connection the positioning arm 7a is rotatable about an axis of rotation disposed at a right angle to the longitudinal direction L. The plate-like adapter 6 is disposed substantially at a right angle to the positioning arm 7a at an upper end of the positioning arm 7a, and a positioning drive 7b in the form of a lifting cylinder preferably designed as an electric cylinder or hydraulic cylinder engages at an opposing lower end in order to move the adapter 6 between the standby position and the operating position (see FIG. 3b) preferably in the longitudinal direction L and in the direction of the vehicle frame 2. Other linear drives can also be used as the positioning drive 7b such as e.g. a belt drive, chain drive or rack and pinion drive.

A wide-body container with a width b2, which amounts to about 2500 to 2550 mm and is therefore wider than the minimum distance d1 cannot be set down in a stable manner on the first set-down surface 2a with its lower side or its corner fittings 5a horizontally orientated since there is a risk of slippage along the guide surfaces 2a and therefore of the container 5 being in an inclined position which is to be avoided (see FIG. 3a). For secure and stable set-down of a container 5 designed as a wide-body container the adapters 6 provided on the transport vehicle 1 must be moved into the operating position. In this way the first set-down surface 2a is deactivated or becomes inoperative and the second set-down surface 2b is activated or becomes operative.

FIG. 3a illustrates the side view according to FIG. 2a with two adapters 6 in the operating position. In the same way, on a rear side, not illustrated, of the transport vehicle 1 two adapters 6 are provided which are likewise in the operating position. In the operating position each adapter 6 is placed with its lower side 6b onto the first set-down surface 2a which therefore serves as a support surface of the transport vehicle 1. The support surface is cleared by the adapter 6 in the standby position (see FIGS. 2a and 2b). The second set-down surface 6a, which is disposed upstream of the deactivated first set-down surface 2a, is formed by the planar upper sides 6c of the adapters 6 which extend in a common horizontal plane and preferably in parallel with their lower side 6b when the adapters 6 are in the operating position.

The second set-down surface 6a is therefore, like the first set-down surface 2a, composed of partial surfaces which are formed by the respective adapters 6. The adapters 6, and in particular the partial surfaces formed thereby, of the second set-down surface 6a are for this purpose each dimensioned in such a way that they can be placed in the operating position completely on the partial surface of the associated first set-down surface 2a without protruding therebeyond in the direction of the lifting platform 8a, 8b in the movement region thereof.

A container 5 designed as a wide-body container is set down on the now operative second set-down surface 6a. For this purpose, the lifting platforms 8a, 8b have been lowered into the transportation position analogously to FIG. 2a. It is also possible to see that the container 5 set down on the second set-down surface 6a is positioned with its lower side, in particular with its lower corner fittings 5a, between the guide elements 2b in a horizontal second plane E2. The second plane E2 is disposed above the first plane E1. By appropriate dimensioning of the thickness or height of the identically formed adapters 6 the second plane E2 is disposed in a region between the guide surfaces 2c of a height at which the guide surfaces 2c no longer extend in parallel to one another at the minimum distance d1 but are spaced apart from one another at a greater distance d2 than in the first plane E1. In this way, a wide-body container can be set down in a secure and stable horizontal orientation on the second set-down surface 6a formed by the adapters 6 without the risk of slippage of its lower corner fittings 5a on the inclined guide surfaces 2c.

FIG. 3b shows the side view according to FIG. 2b with one of the two adapters 6 in the operating position. In this connection, by actuation of the positioning drive 7b the positioning arm 7a is pivoted in such a way that the adapter 6 is placed on the first set-down surface 2a serving as a support surface. In this connection, the two set-down surfaces 2a, 6a extend in mutually parallel horizontal planes. The positioning arm 7a extends substantially at a right angle thereto.

When a container 5 of the standard width b1 is to be set down on the transport vehicle 1 the adapters 6 can be moved back into their standby position in order to deactivate the second set-down surface 6a. The container 5 is then inevitably guided onto the first set-down surface 2a which has thereby become operative and can be guided and reliably set down thereon.

By means of the arrangement of the adapters 6 and in particular of the associated positioning devices 7 shown in the Figures and described above along the two long sides of the transport vehicle 1 and in particular above the vehicle frame 2 thereof, particularly simple retrofitting of transport vehicles 1 is possible in particular in order to use same for automated transportation of wide-body containers. The raising and lowering movement of the lifting platforms 8a, 8b is also advantageously not hindered since the adapters 6 are disposed, in both the standby position and also in the operating position, outside the movement region of the lifting platforms 8a, 8b, extending between the adapters 6. In this way, lifting AGVs fitted with corresponding adapters 6 can discharge containers 5 at a passive transfer station or pick them up therefrom as described e.g. in DE 10 2007 039 778 A1.

Preferably in the case of the above-described transport vehicles 1, for each container 5 to be set down four plate-like adapters 6 are provided, of which each one is positioned and lowered in the operating position in the region of a guide surface 2c and adjacent thereto in such a way that a lower corner fitting 5a can be guided onto the corresponding adapter 6 or the partial surface, formed thereby, of the second set-down surface 6a and can be set down thereon. When two 20 foot long containers 5 are to be set down on the transport vehicle 1 one behind another in the longitudinal direction L, preferably eight adapters 6 are thus provided so that four corner fittings 5a of each container 5 can be set down on corresponding set-down surfaces 6a. As only one inner guide guide element 2b can be provided on each long side, for the 20 foot positions also only one adapter 6 of corresponding length can be disposed on each long side so that a total of six adapters 6 with corresponding positioning devices 7 can suffice.

In the present exemplified embodiment, adapters 6 with positioning devices 7 are disposed only at the 40 foot positions. However, in addition, at each 20 foot position and at each 45 foot position corresponding adapters 6, thus a total of twelve adapters 6, can be provided. In this way, for each container length for each lower corner fitting 5a at each of the above-mentioned positions an adapter 6 can be provided onto which the corner fittings 5a can be supported when the adapters 6 in the operating position can be placed onto the respective support surface.

However, it is also fundamentally possible that only one plate-like or frame-like adapter 6 is provided which is placed onto the transport vehicle 1 in the operating position, e.g. on the upper side 8c of the lifting platforms 8a, 8b when these are lowered in the transportation position on the vehicle frame 2. In this connection, the support surface, via which the adapter 6 in the operating position is placed and supported on the transport vehicle 1, is formed outside the first set-down surface 2a, namely by the upper side 8c of the lifting platforms 8a, 8b lowered on the vehicle frame 2 below and adjacently. In order to move the adapter 6 into the standby position, the adapter 6 can be moved away from the upper side 8c so that the support surface formed by the upper side 8c is cleared.

Alternatively, a further exemplified embodiment is feasible which substantially differs from the exemplified embodiment illustrated in the above-mentioned Figures in that the transport vehicle 1 is not designed as a lifting AGV and accordingly does not comprise any lifting platforms 8a, 8b. The set-down of containers 5 on the set-down surfaces 2a, 6a can then not be effected by the transport vehicle 1 itself.

The invention claimed is:

1. A transport vehicle for containers, said transport vehicle comprising a first set-down surface on which a container can be set down, and having two mutually opposing guide surfaces that extend towards one another in the direction of the first set-down surface in order to guide a container during set-down on the transport vehicle in the direction of the first set-down surface, wherein the first set-down surface is disposed between the guide surfaces, and wherein an adapter is provided that can be moved between a standby position and an operating position in such a way that a container is guided onto the first set-down surface during set-down on the transport vehicle when the adapter is in the standby position, and is guided onto a second set-down surface, which is formed by the adapter and disposed between the guide surfaces, when the adapter is placed onto the transport vehicle in the operating position and the adapter is placed, in the operating position, on a support surface of the transport vehicle which is cleared in the standby position.

2. The transport vehicle as claimed in claim 1, wherein the adapter is movably mounted on the transport vehicle between the standby position and the operating position.

3. The transport vehicle as claimed in claim 2, wherein the adapter has a planar upper side that extends in a horizontal plane when the adapter is in the operating position in order to form the second set-down surface.

4. The transport vehicle as claimed in claim 3, wherein the first set-down surface and the second set-down surface are disposed with respect to one another such that a container set down on the first set-down surface is positioned with its lower corner fittings between the guide surfaces in a horizontal first plane and a container set down on the second set-down surface is positioned with its lower corner fittings between the guide surfaces in a horizontal second plane, the second plane is disposed above the first plane, and in the second plane the guide surfaces are spaced apart at a greater distance from each other than in the first plane.

5. The transport vehicle as claimed in claim 4, wherein the support surface is formed on the first set-down surface.

6. The transport vehicle as claimed in claim 4, wherein the support surface is formed next to and/or below the first set-down surface.

7. The transport vehicle as claimed in claim 4, wherein the adapter can be moved by a positioning device comprising a positioning drive between the standby position and the operating position, wherein the positioning drive is designed as a linear drive and includes a lifting cylinder, or a belt drive, chain drive or rack-and-pinion drive.

8. The transport vehicle as claimed in claim 7, wherein the adapter is disposed on a positioning arm of the positioning device and the positioning arm is mounted on the transport vehicle in a pivotable manner and is drivingly connected to the positioning drive in order to move the adapter between the standby position and the operating position.

9. Use of a transport vehicle as claimed in claim 1 for transportation of a container designed as a wide-body container.

10. The transport vehicle as claimed in claim 1, wherein the adapter has a planar upper side that extends in a horizontal plane when the adapter is in the operating position in order to form the second set-down surface.

11. The transport vehicle as claimed in claim 1, wherein the first set-down surface and the second set-down surface are disposed with respect to one another such that a container set down on the first set-down surface is positioned with its lower side between the guide surfaces in a first plane and a container set down on the second set-down surface is positioned with its lower side between the guide surfaces in a second plane, wherein the second plane is disposed above the first plane, and in the second plane the guide surfaces are spaced apart at a greater distance from each other than in the first plane.

12. The transport vehicle as claimed in claim 11, wherein the first set down surface and the second set-down surface are disposed with respect to one another such that a container set down on the first set-down surface is positioned with its lower corner fittings between the guide surfaces in the first plane and wherein the first plane is horizontal, and a container set down on the second set-down surface is positioned with its lower corner fittings between the guide surfaces in the second plane, and wherein the second plane is horizontal.

13. The transport vehicle as claimed in claim 1, wherein the support surface is formed on the first set-down surface.

14. The transport vehicle as claimed in claim 1, wherein the support surface is formed outside the first set-down surface.

15. The transport vehicle as claimed in claim 14, wherein the support surface is formed next to and/or below the first set-down surface.

16. The transport vehicle as claimed in claim 1, wherein the adapter can be moved by a positioning device comprising a positioning drive between the standby position and the operating position.

17. The transport vehicle as claimed in claim 16, wherein the positioning drive is designed as a linear drive and includes a lifting cylinder.

18. The transport vehicle as claimed in claim 16, wherein the positioning drive is designed as a belt drive, a chain drive or a rack-and-pinion drive.

19. The transport vehicle as claimed in claim 16, wherein the adapter is disposed on a positioning arm of the positioning device and the positioning arm is mounted on the transport vehicle in a movable manner and is drivingly connected to the positioning drive in order to move the adapter between the standby position and the operating position.

* * * * *